United States Patent
Marx et al.

(10) Patent No.: US 11,450,849 B2
(45) Date of Patent: Sep. 20, 2022

(54) ACTIVE MATERIAL POWDER FOR USE IN A NEGATIVE ELECTRODE OF A BATTERY AND A BATTERY COMPRISING SUCH AN ACTIVE MATERIAL POWDER

(71) Applicant: Umicore, Brussels (BE)

(72) Inventors: Nicolas Marx, Olen (BE); Stijn Put, Olen (BE); Jean-Sébastien Bridel, Olen (BE); Boaz Moeremans, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 16/437,199

(22) Filed: Jun. 11, 2019

(65) Prior Publication Data

US 2019/0386300 A1    Dec. 19, 2019

(30) Foreign Application Priority Data

Jun. 15, 2018 (EP) .................................. 18177964

(51) Int. Cl.
*H01M 4/38* (2006.01)
*C01B 33/02* (2006.01)
*H01M 4/02* (2006.01)

(52) U.S. Cl.
CPC ............ *H01M 4/386* (2013.01); *C01B 33/02* (2013.01); *C01P 2004/03* (2013.01); *C01P 2004/04* (2013.01); *C01P 2004/61* (2013.01); *H01M 2004/021* (2013.01); *H01M 2004/027* (2013.01)

(58) Field of Classification Search
CPC .......... H01M 4/386; H01M 2004/021; H01M 2004/027; C01B 33/02; C01P 2004/03; C01P 2004/04; C01P 2004/61
See application file for complete search history.

(56) References Cited

U.S. PATENT DOCUMENTS

2004/0234859 A1* 11/2004 Lee .................... H01M 4/38
429/231.95
2013/0202967 A1    8/2013 Kim et al.
(Continued)

FOREIGN PATENT DOCUMENTS

CN         106410177 B    5/2018
EP           3319154 A1   5/2018
(Continued)

OTHER PUBLICATIONS

JP2016100226A English machine translation (Year: 2021).*
(Continued)

*Primary Examiner* — Ula C Ruddock
*Assistant Examiner* — Armindo Carvalho, Jr.
(74) *Attorney, Agent, or Firm* — NK Patent Law (57) ABSTRACT

An active material powder for use in a negative electrode of a battery, wherein the active material powder comprises active material particles, wherein the active material particles comprise silicon-based particles, wherein when said active material powder is crossed by a plane, then at least 65% of the discrete cross-sections of the silicon-based particles included in that plane, satisfy optimized conditions of shape and size, allowing the battery containing such an active material powder to achieve a superior cycle life and a production method of such an active material powder.

16 Claims, 3 Drawing Sheets

(56) References Cited

U.S. PATENT DOCUMENTS

| | | | |
|---|---|---|---|
| 2015/0044571 A1* | 2/2015 | Abdelsalam | H01M 4/583 |
| | | | 429/231.8 |
| 2016/0308205 A1* | 10/2016 | Canham | H01M 4/386 |
| 2017/0214042 A1 | 7/2017 | Cho et al. | |
| 2017/0346073 A1 | 11/2017 | Put et al. | |
| 2018/0013137 A1 | 1/2018 | Put et al. | |
| 2019/0260020 A1 | 8/2019 | Yamamoto et al. | |

FOREIGN PATENT DOCUMENTS

| | | | |
|---|---|---|---|
| JP | 2013161785 A | 8/2013 |
| JP | 2016100226 A | 5/2016 |
| JP | 2017528868 A | 9/2017 |
| JP | 2018501620 A | 1/2018 |
| JP | 2018506145 A | 3/2018 |
| JP | 201850162 A | 9/2019 |
| KR | 20160088338 A | 7/2016 |
| WO | 2016174022 A1 | 11/2016 |
| WO | 2017216558 A1 | 12/2017 |
| WO | 2018088248 A1 | 5/2018 |

OTHER PUBLICATIONS

EPO; Extended European Search Report for European Patent Application No. 18177964.6 dated Dec. 4, 2018, 12 pages.
"A Basic Guide To Particle Characterization", Inform White Paper, Malverm Instruments Worldwide, 2012, 26 pages.

* cited by examiner

ACTIVE MATERIAL POWDER FOR USE IN A NEGATIVE ELECTRODE OF A BATTERY AND A BATTERY COMPRISING SUCH AN ACTIVE MATERIAL POWDER

CROSS-REFERENCE TO RELATED APPLICATIONS

This application claims the benefit of European Patent Application No. 18177964.6, filed Jun. 15, 2018, the entire contents of which is hereby incorporated herein by reference.

TECHNICAL FIELD AND BACKGROUND

The present invention relates to an active material powder suitable for use in a negative electrode of a battery and a battery comprising such an active material powder.

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular battery's energy density is the active material in the anode. Therefore, to improve the energy density, the use of electrochemically active materials comprising silicon in the negative electrode have been investigated over the past years.

A drawback of using a silicon-based electrochemically active material in an anode is its large volume expansion during charging, which is as high as 300% when the lithium ions are fully incorporated, e.g. by alloying or insertion, in the anode's active material—a process often called lithiation. The large volume expansion of the silicon-based materials during Li incorporation may induce stress in the silicon-based particles, which in turn could lead to a mechanical degradation of the silicon-based material. Repeated periodically during charging and discharging of the Li-ion battery, the repetitive mechanical degradation of the silicon-based electrochemically active material may reduce the life of a battery to an unacceptable level.

Further, a negative effect associated with silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle, the SEI formation is a self-terminating process that stops as soon as a 'passivation layer' has formed on the surface of the silicon-based material. However, because of the volume expansion of silicon-based particles, both silicon-based particles and the SEI may be damaged during discharging (lithiation) and recharging (de-lithiation), thereby freeing new silicon surface and leading to a new onset of SEI formation To solve the above-mentioned drawbacks, active material powders wherein the silicon-based particles are mixed with at least one component suitable to protect the silicon particles from electrolyte decomposition and to accommodate volume changes, are usually used.

Such a component may be a carbon-based material, preferably under the form of a matrix.

Despite the use of such active material powders, there is still room for improvement of the performance of batteries containing Si-based anode materials.

In the art, the performance of a battery containing Si-based anode materials is generally quantified by a so-called cycle life of a full-cell, which is defined as the number of times or cycles that a cell comprising such material can be charged and discharged until it reaches 80% of its initial discharge capacity. Most works on silicon-based anode materials are therefore focused on improving said cycle life.

It is an object of the present invention to provide a stable anode material, which once used in the negative electrode in the battery, is advantageous in that it allows achieving an improved cycle life of the battery.

SUMMARY OF THE INVENTION

This objective is achieved by providing an active material powder according to claim 1 which once used in a negative electrode in the battery, allows to achieve improved cycle life of the battery without loss of specific capacity.

The present invention concerns the following embodiments:

Embodiment 1

In a first aspect, the present invention concerns an active material powder as an anode material for use in the negative electrode of the battery, said active material powder comprising active material particles, wherein the active material particles comprise silicon-based particles, said active material powder being characterized in that, when it is crossed by a plane so that at least 1000 discrete cross-sections of silicon-based particles, having a perimeter and an area, are included in said plane, then at least 65% of said at least 1000 discrete cross-sections of silicon-based particles have both:

a shape factor $SF=d_{disc}/d_{max}$ superior or equal to 0.4 and inferior or equal to 0.8, and a $d_{max}$ superior or equal to 10 nm and inferior or equal to 250 nm, wherein $d_{max}$ is the linear distance between the two most distant points of the perimeter of a discrete cross-section of a silicon-based particle, and wherein $d_{disc}$ is the diameter of a discus having an identical area as the one of said discrete cross-section of a silicon-based particle.

In an alternative first aspect, the present invention concerns an active material powder as an anode material for use in the negative electrode of the battery, said active material powder comprising active material particles, wherein the active material particles comprise silicon-based particles, considering a plane crossing said active material powder so that at least 1000 discrete cross-sections of said silicon-based particles, having a perimeter and an area, are included in said plane, then at least 65% of said at least 1000 discrete cross-sections of silicon-based particles have both:

a shape factor SF=$d_{disc}/d_{max}$ superior or equal to 0.4 and inferior or equal to 0.8, and a $d_{max}$ superior or equal to 10 nm and inferior or equal to 250 nm, wherein $d_{max}$ is the linear distance between the two most distant points of the perimeter of a discrete cross-section of a silicon-based particle, and wherein $d_{disc}$ is the diameter of a discus having an identical area as the one of said discrete cross-section of said silicon-based particle.

In the framework of the present invention, a fraction of at least 65% of at least 1000 discrete cross-sections of silicon-based particles must be understood as being a numerical fraction of at least 1000 discrete cross-sections of silicon-based particles.

When a cross-section of an active material powder according to the present invention is performed, the active material powder is crossed by a plane, the same plane thus crosses the active material powder, the active material particles comprised in the active material powder and the silicon-based particles comprised in the active material particles. A cross-section according to the present invention therefore represents the intersection of a solid body, said solid body being for example the active material powder, the active material particles or the silicon-based particles, in three-dimensional space with this plane.

In the framework of the present invention, the intersection of a solid body with a plane is defined by an area, which is delimited by a perimeter being a continuous line forming the boundary of a cross-section in said plane.

Therefore, a discrete cross-section is defined by an individual area and perimeter that are distinct or separate from other areas and perimeters of other discrete cross-sections included in the same plane.

By the linear distance between the two most distant points of the perimeter of a cross-section, it is meant the shortest distance between those two points.

By at least 1000 discrete cross-sections of said silicon-based particles, it is meant at least 1000 single (or non-overlapping) cross-sections of silicon-based particles included in the plane crossing the active material powder.

Said at least 1000 discrete cross-sections of said silicon-based particles may be considered as representative of a total number of discrete cross-sections of silicon-based particles included in the plane crossing the active material powder.

In the framework of the present invention; the cross-section of the active material powder may comprise at least 65% of the predetermined number of discrete cross-sections of silicon-based particles included in said cross-section of the active material powder having a shape factor SF=$d_{disc}/d_{max}$ superior or equal to 0.4 and inferior or equal to 0.8 and a $d_{max}$ superior or equal to 10 nm and inferior or equal to 250 nm.

Preferably, said at least 65% of said discrete cross-sections of silicon-based particles have both a shape factor SF superior or equal to 0.5 and inferior or equal to 0.8 and a $d_{max}$ superior or equal to 10 nm and inferior or equal to 250 nm.

By an active material powder, it is meant an electrochemically active material for use as anode material in the negative electrode of the battery.

By a silicon-based particle, it is meant a cluster of mainly silicon atoms. A plurality of such silicon-based particles may be considered as a silicon powder.

The average silicon content in such a silicon-based particle is preferably 65 weight % or more, and more preferably 80 weight % or more with respect to the total weight of the silicon-based particle.

The silicon-based particles may have any shape, e.g. substantially spherical but also irregularly shaped, rod-shaped, plate-shaped, etc.

Preferably the active material powder according to Embodiment 1 has an average silicon content A with respect to the total weight of the active material powder, wherein 5.0 wt %<A<60 wt %, and wherein more preferably 10 wt %<A<50 wt %.

In the present invention, the discrete cross-sections of the silicon-based particles according to Embodiment 1 may have a size $d_{max}$ inferior or equal to 250 nm, since particles having a discrete cross-section with a $d_{max}$ superior to 250 nm may be more subject to pulverization during consecutive charge/discharge cycles. This pulverization may lead to loss of contacts with the current collector or the conductive matrix and create fresh silicon surface in contact with the electrolyte, both leading to a loss of battery capacity. The silicon-based particles according to Embodiment 1 also may have a discrete cross-section with a $d_{max}$ of at least 10 nm, since below this value the surface of silicon may represent a too large part of the total volume of the particle. The amount of oxygen from the native silicon oxide layer present at the surface may have a too large weight percentage and thus may lead to a too low specific capacity of the silicon-based particles.

Alternatively, the silicon-based particles according to Embodiment 1 may have a discrete cross-section with a shape factor SF inferior or equal to 0.8, since elongated silicon-based particles are closer to 2D objects and may have an anisotropic swelling behaviour along their smallest dimension, the swelling possibly occurring in the direction of least resistance, whereas silicon-based spheres may have an isotropic swelling behaviour. This isotropic swelling of the spheres during repetitive charge/discharge cycles may be responsible for higher mechanical constraints, possibly damaging the Si/matrix interface and the Solid Electrolyte Interface. As a consequence, fresh silicon particles surface may get exposed to electrolyte decomposition, which may reduce the cycle life of a battery containing such material. The silicon-based particles according to Embodiment 1 may also have a discrete cross-section with a shape factor of at least 0.4, since silicon-based particles that are too elongated may suffer from the drawbacks usually assigned to silicon wires, possibly being a high specific surface in contact with the electrolyte and a lower anode current density.

In the framework of the present invention, it has been observed that the battery comprising the negative electrode using the active material powder according to the present invention has a superior cycle life compared to batteries using a traditional anode powder at comparable silicon content.

Indeed, it has been observed that: i.) a decrease of the swelling together with ii.) a high specific capacity of the active material powder; inducing iii.) a higher cycle life of the battery wherein said active material powder is used as the negative electrode, could be achieved by a combination of the claimed shape factor and $d_{max}$ values, for at least 65% of the discrete cross-sections of the silicon-based particles included in the cross-section of the active material powder.

Embodiment 2

In a second embodiment according to Embodiment 1, at least 70% of the at least 1000 discrete cross-sections of said silicon-based particles not contacting with each other and included in the plane crossing the active material powder have both a shape factor SF=$d_{disc}/d_{max}$ superior or equal to 0.4 and inferior or equal to 0.8, and a $d_{max}$ superior or equal to 10 nm and inferior or equal to 250 nm.

Embodiment 3

In a third embodiment according to Embodiment 1 or 2, the active material powder further comprises a matrix material.

Embodiment 4

In a fourth embodiment according to any of the Embodiments 1 to 3, the active material powder has a volume-based particle size distribution having a d10 comprised between 1 µm and 10 µm, and a d50 comprised between 3 and 30 µm, and a d90 comprised between 5 and 50 µm.

Embodiment 5

In a fifth embodiment according to any of the Embodiments 1 to 4, the active material powder has an oxygen content and an average silicon content A with respect to the total weight of the active material powder expressed as wt %, wherein the oxygen content expressed in wt % is less than 35% of A, wherein preferably the oxygen content expressed in wt % is less than 20% of A.

Embodiment 6

In a sixth embodiment according to any of the Embodiments 1 to 5, the active material powder has a specific surface characterized by a BET value of less than 10 m²/g, and preferably of less than 5 m²/g.

Embodiment 7

In a seventh embodiment according to any of the Embodiments 1 to 6, the active material particles comprised in the active material powder have a porosity of less than 20% in volume and preferably less than 10% in volume %. More preferably, the active material particles comprised in the active material powder are non-porous particles.

Embodiment 8

In an eighth embodiment according to any of the Embodiments 1 to 7, the active material powder comprises at least 90% by weight with respect to the total weight of the active material powder, and preferably at least 95% by weight, of said active material particles.

Embodiment 9

In a ninth embodiment according to any of the Embodiments 2 to 8, the silicon-based particles comprised in the active material powder are embedded in the matrix material, wherein the matrix material separates silicon-based particles or groups of silicon-based particles from other silicon-based particles or groups of silicon-based particles.

Optionally, such a silicon-based particle may be either a cluster of mainly silicon atoms in a matrix made from different material or a discrete silicon particle.

In this Embodiment 9, the matrix may be a continuous (non-particulate), porous or non-porous, material or a particulate material.

Embodiment 10

In a tenth embodiment according to any of the Embodiments 2 to 9, the matrix material comprised in the active material powder is a carbon-based matrix material, and is more preferably at least one of the following compounds: polyvinyl alcohol (PVA), polyvinyl chloride (PVC), sucrose, coal-tar pitch and petroleum pitch, or a thermally decomposed product of at least one of said compounds.

In this Embodiment 10, the matrix material may alternatively be metallic but different from silicon, or may be metal oxide or silicon oxide.

Embodiment 11

In an eleventh embodiment according to any of the Embodiments 2 to 10, the active material powder also contains graphite, wherein the graphite is not embedded in the matrix material.

Embodiment 12

In a twelfth embodiment according to any of the Embodiments 1 to 11, the silicon-based particles have a chemical composition having at least 65% by weight of silicon, and preferably having at least 80% by weight of silicon, wherein preferably the silicon-based particles are free of other elements than Si and O.

Embodiment 13

In a thirteenth embodiment according to any of the Embodiments 1 to 12, the invention further concerns a battery comprising any of the variants of the active material powder as defined above, wherein preferably the battery has a negative electrode, wherein the active material powder is present in the negative electrode.

Embodiment 14

In a fourteenth embodiment according to any of the Embodiments 1 to 13, the invention finally concerns an electronic device comprising the battery comprising the negative electrode, wherein the active material powder is present in the negative electrode.

DETAILED DESCRIPTION

In order to better illustrate the invention, the following experimental results are provided.
Analytical Methods Used
Determination of Oxygen Content The oxygen contents of the powders in the examples and the counterexamples are determined by the following method, using a Leco TC600 oxygen-nitrogen analyzer. A sample of the powder is put in a closed tin capsule that is put itself in a nickel basket. The basket is put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.
Determination of the Electrochemical Performance The active material powders to be evaluated are sieved using a 45 μm sieve and mixed with carbon black, carbon fibers and sodium carboxymethyl cellulose binder in water (2.5 wt %). The ratio used is 89 weight parts active material powder/1 weight part carbon black (C65)/2 weight parts carbon fibers (VGCF) and 8 weight parts carboxymethyl cellulose (CMC) for the active material powders having a specific capacity of about 720 mAh/g (~15 wt % Si content) and 85 weight parts active material powder/1 weight part carbon black/2 weight parts carbon fibers and 12 weight parts CMC for the active material powders having a specific capacity of about 1260 mAh/g (~35 wt % Si content). These components are mixed in a Pulverisette 7 planetary ball mill for 30 minutes at 250 rpm.

A copper foil cleaned with ethanol is used as current collector for the negative electrode. A 200 μm thick layer of the mixed components is coated on the copper foil. The coating is dried for 45 minutes in vacuum at 70° C. A 13.86 $cm^2$ rectangular shaped electrode is punched from the dried coated copper foil, dried overnight at 110° C. under vacuum and used as negative electrode in a pouch-cell.

The positive electrode is prepared as follows: a commercial $LiNi_{3/5}Mn_{1/5}Co_{1/5}O_2$ (NMC 622) powder is mixed with carbon black (C65), carbon fibers (VGCF) and a solution of 8 wt % polyvinylidene difluoride (PVDF) binder in N-Methyl-2-pyrrolidone (NMP). The ratio used is 92 weight parts of a commercial NMC 622 powder/1 weight part carbon black/3 weight parts carbon fibers and 4 weight parts PVDF. The components are mixed in a Pulverisette 7 planetary ball mill for 30 minutes at 250 rpm. An aluminum foil cleaned with ethanol is used as current collector for the positive electrode. A layer of the mixed components is coated on the aluminum foil, with a thickness ensuring a ratio negative electrode capacity over positive electrode capacity of 1.1. The coating is dried for 45 minutes in vacuum at 70° C. A 11.02 $cm^2$ rectangular shaped electrode is punched from the dried coated aluminum foil, dried overnight at 110° C. under vacuum and used as positive electrode in a pouch-cell.

The electrolyte used is 1M $LiPF_6$ dissolved in EC/DEC solvents (1/1 in volume)+2 wt % VC+10 wt % FEC additives. All samples are tested in a high precision battery tester (Maccor 4000 series).

The assembled pouch-cells are then tested using the procedure described below, where the first cycle corresponds to the conditioning of the battery and where "CC" stands for "constant current" and "CCCV" stands for "constant current constant voltage".

Cycle 1:
Rest 4 h (Initial rest)
Charge at C/40 until 15% of Theoretical Cell Capacity
Rest 12 h
CC charge at C/20 to 4.2V
CC discharge at C/20 to 2.7V
From cycle 2 on:
CCCV charge at C/2 (cut-off C/50) to 4.2V
CC discharge at C/2 to 2.7V It is well established that a cycle life of at least 300 cycles in such a full-cell is required for an anode material with a specific capacity of about 720 mAh/g, in view of a commercial application. A cycle life of at least 150 cycles is required for an anode material with a specific capacity of about 1260 mAh/g.
Determination of the Particle Size of the Discrete Cross-Sections of Silicon-Based Particles In order to measure $d_{max}$ and $d_{disc}$ following a SEM-based procedure, 500 mg of the active material powder is embedded in 7 g of a resin (Buehler EpoxiCure 2) consisting of a mix of 4 parts Epoxy Resin (20-3430-128) and 1 part Epoxy Hardener (20-3432-032). The resulting sample of 1" diameter is dried during at least 8 hours. It is then polished, first mechanically using a Struers Tegramin-30 until a thickness of maximum 5 mm is reached, and then further polished by ion-beam polishing (Cross Section Polisher Jeol SM-09010) for about 6 hours at 6 kV, to obtain a polished surface. A carbon coating is finally applied on this polished surface by carbon sputtering using a Cressington 208 carbon coater for 12 seconds, to obtain the sample that will be analyzed by SEM.

In order to measure $d_{max}$ and $d_{disc}$ following a TEM-based procedure, 10 mg of the active material powder is placed in a focused ion beam scanning electrode microscope (FIB-SEM) equipment. A platinum layer is deposited on top of the surface of the active material powder. A lamella of the active material powder is extracted using the FIB, an example of the obtained lamella is given in FIG. 2 (left). This lamella is further placed on a TEM sample holder and analyzed following the procedure described below.

Figure 3:
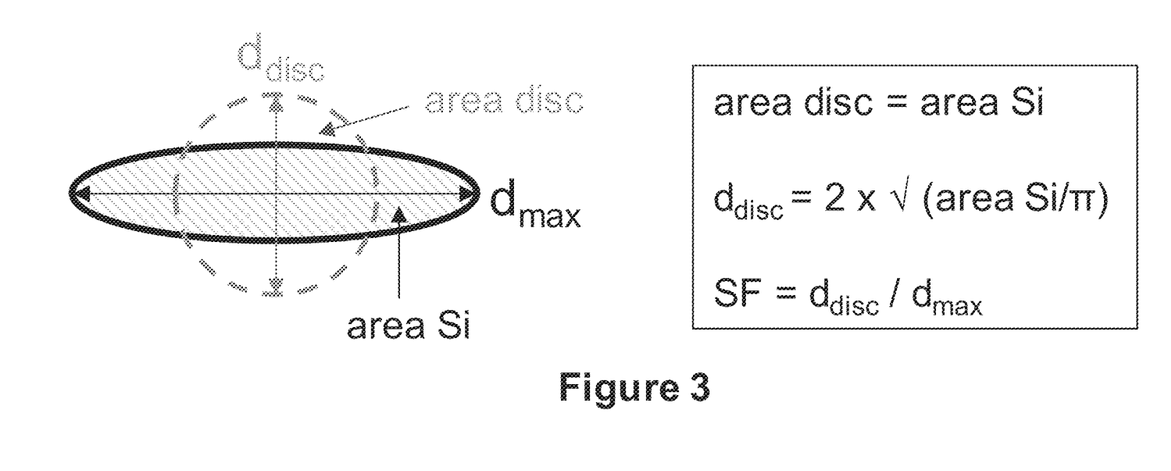
FIG. 3: Schematic representation of the determination of $d_{max}$ and $d_{disc}$ for a schematic cross-section of a Si-based particle. The maximum size $d_{max}$ is the linear distance between the two most distant points of the perimeter of the cross-section of a silicon-based particle. The equivalent diameter $d_{disc}$ is the diameter of the discus having an identical area (area disc) as the area of said cross-section of said silicon-based particle (area Si).

The maximum size $d_{max}$ (see FIG. 3) of a discrete cross-section of a silicon-based particle is determined by SEM or TEM imagery by measuring the linear distance between the two most distant points of the perimeter of the discrete cross-section of the silicon-based particle.

The equivalent diameter $d_{disc}$ (see FIG. 3) of a discrete cross-section of a silicon-based particle is determined by SEM or TEM imagery too, by measuring the area of the discrete cross-section of said silicon-based particle (area Si) and calculating the diameter of the discus having an identical area as the one of said discrete cross-section of said silicon-based particle. This is done by applying the formula $$d_{disc} = 2 \times \sqrt{\frac{\text{area } Si}{\pi}}.$$

The shape factor of a discrete cross-section of a silicon particle is provided by the formula $SF = d_{disc}/d_{max}$.

For the purpose of illustrating, in a non-limitative way, the determination of the shape factor, a SEM-based procedure is detailed for the active material powder Example 1 (E 1) provided below. Although Example 1 refers to a SEM-based procedure, other embodiments in the scope of the invention can be characterized by a similar TEM-based procedure.

1. Multiple SEM images of the cross-section of the active material powder are acquired
2. The contrast and brightness settings of the images are adjusted for an easy visualization of the cross-sections of the silicon-based particles.
3. At least 1000 discrete cross-sections of silicon-based particles, not overlapping with another cross-section of a silicon-based particle, are selected from one or several of the acquired SEM image(s), using a suitable image analysis software. These discrete cross-sections of silicon-based particles can be selected from one or more cross-sections of active material particles of a given active material powder.
4. $d_{max}$ values and areas (area Si) of the discrete cross-sections of the silicon-based particles are measured using a suitable image analysis software, $d_{disc}$ values are calculated, applying the formula $$d_{disc} = 2 \times \sqrt{\frac{\text{area } Si}{\pi}}$$

and the shape factor values are then calculated for each of those at least 1000 discrete cross-sections of silicon-based particles, applying the equation $SF=d_{disc}/d_{max}$.

5. The number of discrete cross-sections of silicon-based particles satisfying both i. a shape factor $SF=d_{disc}/d_{max}$ superior or equal to 0.4 and inferior or equal to 0.8, and ii. a $d_{max}$ superior or equal to 10 nm and inferior or equal to 250 nm are counted and the percentage of cross-sections of silicon-based particles satisfying both above-mentioned conditions is calculated.

Determination of Particle Size of Active Material Powders

The volume-based particle size distribution for active material powders is determined with a Malvern Mastersizer 2000. The following measurement conditions are selected: compressed range; active beam length 2.4 mm; measurement range: 300 RF; 0.01 to 900 µm. The sample preparation and measurement are carried out in accordance with the manufacturer's instructions.

Experimental Preparation of Counterexamples and Examples

Counterexample 1, not According to the Invention

A silicon nano powder is obtained by applying a 50 kW radio frequency (RF) inductively coupled plasma (ICP), using argon as plasma gas, to which a micron-sized silicon powder precursor is injected at a rate of circa 200 g/h, resulting in a prevalent (i.e. in the reaction zone) temperature above 2000K. In this first process step, the precursor becomes totally vaporized. In a second process step, an argon flow of 90 Nm$^3$/h is used as quench gas immediately downstream of the reaction zone in order to lower the temperature of the gas below 1600K, causing a nucleation into metallic submicron silicon powder. Finally, a passivation step is performed at a temperature of 100° C. during 5 minutes by adding 100 l/h of a $N_2/O_2$ mixture containing 1 mole % oxygen.

The particle size distribution of the silicon nano powder is determined to be: d10=63 nm, d50=113 nm and d90=205 nm and the oxygen content was 6.9 wt %.

All these values are also reported in Table 1.

In order to produce an active material powder, a blend is made of the mentioned silicon nano powder and a carbon precursor selected from the list of polyvinyl alcohol (PVA), polyvinyl chloride (PVC), sucrose, coal-tar pitch and petroleum pitch. The ratio of silicon to carbon precursor is chosen such as after the thermal decomposition at 1000° C. of the carbon precursor, the silicon to carbon ratio is equal to 1.

This mixture is heated to a temperature 20° C. above the melting point under $N_2$ and, after a waiting period of 60 minutes, mixed for 30 minutes under high shear by means of a Cowles dissolver-type mixer operating at 1000 rpm.

The mixture of silicon nano powder in the carbon precursor thus obtained is cooled under $N_2$ to room temperature and, once solidified, pulverized and sieved on a 400 mesh sieve, to produce an intermediate active material powder.

This intermediate active material powder is further mixed with graphite, in the proportion allowing to reach a silicon content of 15.0 wt % (±0.3 wt %) in the final active material powder, on a roller bench for 3 hours. After this, the obtained mixture is passed through a mill to de-agglomerate it. At these conditions, a good homogeneity is obtained but the graphite does not become embedded in the carbon precursor.

A thermal after-treatment is given to the obtained mixture of silicon, carbon precursor and graphite as follows: the product is placed in a quartz crucible in a tube furnace, heated up at a heating rate of 3° C./min to 1000° C., kept at that temperature for two hours and then cooled. All this is performed under argon atmosphere.

The fired product is ball-milled for 1 hour at 200 rpm with alumina balls and sieved over a 325 mesh sieve to form a final active material powder, further called active material powder CE 1.

The total Si content in active material powder CE 1 is measured to be 15.1 wt % by XRF, having an experimental error of +/−0.3 wt %. The oxygen content of the active material powder CE 1 is measured to be 1.5 wt %.

For this active material powder CE 1, the percentage of the total number of discrete cross-sections of silicon-based particles satisfying both conditions of shape factor 0.4<SF<0.8 and 10 nm<$d_{max}$<250 nm is measured to be 34%. The same percentage is obtained for discrete cross-sections of silicon-based particles satisfying both conditions of shape factor 0.5<SF<0.8 and 10 nm<$d_{max}$<250 nm.

All properties of CE 1 are also given in Table 2.

Counterexample 2, not According to the Invention

Analogously to active material powder CE 1, another counter-example active material powder CE 2 is produced having a different Si shape, by adding a dry-milling step after the plasma synthesis. Compared to CE 1, the following parameters are modified to produce the silicon powder: the radio-frequency is set at 45 kW, the precursor injection rate is set at 260 g/h and the argon flow for the quench is set at 60 Nm$^3$/h. These values are also reported in Table 1.

In order to modify the shape of the obtained silicon particles, a dry-milling step is performed. The powder obtained after plasma synthesis is thus milled in a Simoloyer high-energy ball-mill using a rotation speed of 800 rpm, a ball-to-powder mass ratio (BPR) of 20:1 and a milling time of 230 minutes. Heptane is used as process control agent (PCA) in amount of 4 wt % relative to the silicon powder, to prevent the powder from sticking to the wall and to the beads. The Si powder is milled under argon atmosphere. The values of particle size distribution and oxygen content measured for this silicon powder obtained after milling are given in Table 1.

It is provided that the dry-milling step not only influences the shape but also the size of the silicon-based particles, since the dry-milling tends to reduce the size of a particle. Hence, for a pre-determined Si-based particle size, resulting from a longer milling time, the size of the silicon-based particles produced in the plasma process prior to milling, must be increased to achieve said pre-determined Si-based particle size. This may be done by means of combining a reduced power with an increased injection rate and a reduced quench flow.

Similarly, finer particles may for example be obtained either by increasing the power and the quench flow and reducing the injection rate of the plasma process, or by increasing the milling time and speed during the dry-milling step, or by combining both processes.

Alternatively, the shape factor of the particles may be reduced by increasing the milling time and speed.

An active material powder CE 2 is then produced using this milled silicon powder, following the same process as described for the active material powder CE 1. The total Si content in active material powder CE 2 is measured to be 14.9 wt % by XRF. The oxygen content of the active material powder CE 2 is measured to be 1.4 wt %.

For this active material powder CE 2, the percentage of the total number of discrete cross-sections of silicon-based particles satisfying both conditions of shape factor $0.4<SF<0.8$ and $10\ nm<d_{max}<250\ nm$ is measured to be 62% and the percentage of the total number of discrete cross-sections of silicon-based particles satisfying both conditions of shape factor $0.5<SF<0.8$ and $10\ nm<d_{max}<250\ nm$ is measured to be 60%.

All properties of CE 2 are also given in Table 2.

Example 1, According to the Invention

In order to produce an active material powder E 1 according to the invention, a process similar to the one used to produce CE 2 is used.

A silicon nanopowder is first prepared using a plasma process with the following parameters: the radio-frequency is set at 40 kW, the precursor injection rate is set at 330 g/h and the argon flow for the quench is set at 40 Nm³/h. These values are also given in Table 1.

In order to modify the shape of the obtained silicon-based particles, a dry-milling step is performed. The powder obtained after plasma synthesis is thus milled in a Simoloyer high-energy ball-mill using a rotation speed of 800 rpm, a ball-to-powder mass ratio (BPR) of 20:1 and a milling time of 495 minutes. Heptane is used as process control agent (PCA) in amount of 4 wt % relative to the silicon powder, to prevent the powder from sticking to the wall and to the beads. The Si powder is milled under argon atmosphere. The values of particle size distribution and oxygen content measured for this silicon powder obtained after milling are given in Table 1.

An active material powder E 1 is then produced using this milled silicon powder, following the same process as described for the active material powder CE 1. The total Si content in active material powder E 1 is measured to be 15.0 wt % by XRF. The oxygen content of the active material powder E 1 is measured to be 1.4 wt %.

For this active material powder E 1, the percentage of the total number of discrete cross-sections of silicon-based particles satisfying both conditions of shape factor $0.4<SF<0.8$ and $10\ nm<d_{max}<250\ nm$ is measured to be 79% and the total number of discrete cross-sections of silicon-based particles satisfying both conditions of shape factor $0.5<SF<0.8$ and $10\ nm<d_{max}<250\ nm$ is measured to be 77%.

All properties of E 1 are also given In Table 2.

Figure 1:
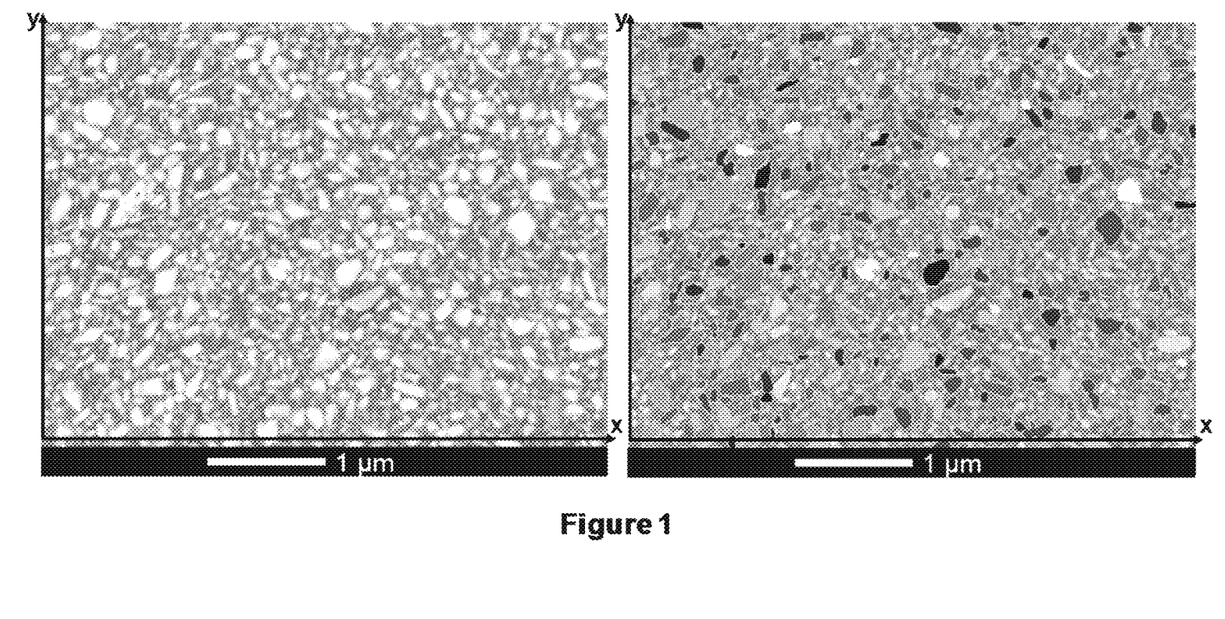
FIG. 1: SEM-based analysis of a cross-section performed on the active material powder Example 1 (E 1) in the xy plane. A cross-section of the active material powder leads to multiple SEM pictures, the image on the left side being one example. The right picture is the same image after an image analysis treatment as described below, indicating in different shades of grey the discrete cross-sections of the Si-based particles, included in the same xy plane. The $d_{max}$ and $d_{disc}$ values of those discrete cross-sections of Si-based particles are then further extracted and analysed as described below. For a given active material powder, several SEM pictures are usually necessary to reach at least 1000 discrete cross-sections of silicon-based particles.

A powder in which particles having both a shape factor SF superior or equal to 0.4 and inferior or equal to 0.8 and a $d_{max}$ superior or equal to 10 nm and inferior or equal to 250 nm, constitute at least 65 percent of the field of view provided by SEM, may be referred to as a powder according to the present invention. Alternatively, a powder in which particles having both a shape factor SF superior or equal to 0.5 and inferior or equal to 0.8 and a $d_{max}$ superior or equal to 10 nm and inferior or equal to 250 nm, constitute at least 65 percent of the field of view provided by SEM, may equivalently be referred to as a powder according to the present invention. FIG. 1 is a SEM picture (magnification ×25000) showing the cross-sections of Si-based particles comprised in the active material powder E 1.

Example 2, According to the Invention

In order to produce an active material powder E 2 according to the invention, a process similar to the one described to produce E 1 is used.

A silicon nanopowder is first prepared using a plasma process with the following parameters: the radio-frequency is set at 35 kW, the precursor injection rate is set at 380 g/h and the argon flow for the quench is set at 35 Nm³/h. These values are also given in Table 1.

In order to modify the shape of the obtained silicon-based particles, a dry-milling step is performed with a milling time of 950 minutes, using the same set-up as for E 1. The values of particle size distribution and oxygen content measured for this silicon powder obtained after milling are given in Table 1.

An active material powder E 2 is then produced using this milled silicon powder, following the same process as described for the active material powder CE 1. The total Si content in active material powder E 2 is measured to be 14.9 wt % by XRF. The oxygen content of the active material powder E 2 is measured to be 1.4 wt %.

For this active material powder E 2, the percentage of the total number of discrete cross-sections of silicon-based particles satisfying both conditions of shape factor $0.4<SF<0.8$ and $10\ nm<d_{max}<250\ nm$ is measured to be 92% and the total number of discrete cross-sections of silicon-based particles satisfying both conditions of shape factor $0.5<SF<0.8$ and $10\ nm<d_{max}<250\ nm$ is measured to be 86%.

All properties of E 2 are also given in Table 2.

TABLE 1

Process parameters used for the production of nano-silicon powders, powders further used for the production of active material powders CE 1, CE 2, E 1 and E2, and physico-chemical properties of those nano-silicon powders
Table 1

|  | Si powder used in Counter Example 1 (CE 1) | Si powder used in Counter Example 2 (CE 2) | Si powder used in Example 1 (E 1) | Si powder used in Example 2 (E 2) |
|---|---|---|---|---|
| Radio frequency/ Power (kW) | 50 | 45 | 40 | 35 |
| Precursor injection rate (g/h) | 200 | 260 | 330 | 380 |

TABLE 1-continued

Process parameters used for the production of nano-silicon powders, powders further used for the production of active material powders CE 1, CE 2, E 1 and E2, and physico-chemical properties of those nano-silicon powders
Table 1

|  | Si powder used in Counter Example 1 (CE 1) | Si powder used in Counter Example 2 (CE 2) | Si powder used in Example 1 (E 1) | Si powder used in Example 2 (E 2) |
|---|---|---|---|---|
| Argon flow/quench (Nm³/h) | 90 | 60 | 40 | 35 |
| Milling time (min) | 0 | 230 | 495 | 950 |
| Oxygen content (%) | 6.9 | 7.2 | 7.1 | 7.2 |
| d10 (nm) | 63 | 61 | 62 | 62 |
| d50 (nm) | 113 | 111 | 112 | 111 |
| d90 (nm) | 205 | 208 | 206 | 207 |

TABLE 2

Silicon and oxygen contents and percentage of discrete cross-sections of silicon-based particles satisfying both conditions of shape factor and $d_{max}$ measured for the final active material powders CE 1, CE 2, E 1 and E 2
Table 2

|  | Counter Example 1 (CE 1) | Counter Example 2 (CE 2) | Example 1 (E 1) | Example 2 (E 2) |
|---|---|---|---|---|
| Si content (%) | 15.1 | 14.9 | 15.0 | 14.9 |
| O content (%) | 1.5 | 1.4 | 1.4 | 1.4 |
| Percentage of discrete cross-sections of Si-based particles satisfying $0.4 < SF < 0.8$ and $10\ nm < d_{max} < 250\ nm$ (%) | 34 | 62 | 79 | 92 |
| Percentage of discrete cross-sections of Si-based particles satisfying $0.5 < SF < 0.8$ and $10\ nm < d_{max} < 250\ nm$ (%) | 34 | 60 | 77 | 86 |

Counter Examples 3 and 4, not According to the Invention and Examples 3 and 4, According to the Invention The same methodology is applied to obtain 4 active material powders with Si contents of 35.0 wt % (±0.3 wt %). The same 4 intermediate active material powders used to produce the final active material powders CE 1, CE 2, E 1 and E 2 are also used to produce respectively the final active material powders CE 3, CE 4, E 3 and E 4, following the procedure described for the active material powder CE 1. The only difference is that the ratio "intermediate active material" vs. graphite used to produce the final active material powders CE 3, CE 4, E 3 and E 4 is chosen to reach a final Si content of 35.0 wt % (±0.3 wt %) instead of 15.0 wt % (±0.3 wt %) in the case of the active material powder CE 1. The values concerning the silicon powders reported in Table 3 are thus similar to the values reported in Table 1, whereas the values presented in Table 4 slightly differ from the values presented in Table 2. Logically, since the silicon powders used are similar, the percentages of discrete cross-sections of silicon-based particles satisfying both conditions of shape factor and $d_{max}$, measured for the final active material powders CE 3, CE 4, E 3 and E 4, are very close to the ones found for CE 1, CE 2, E 1 and E2. The small differences reflect a normal variation resulting from new SEM or TEM cross-section sample preparations and analyses.

Figure 2:
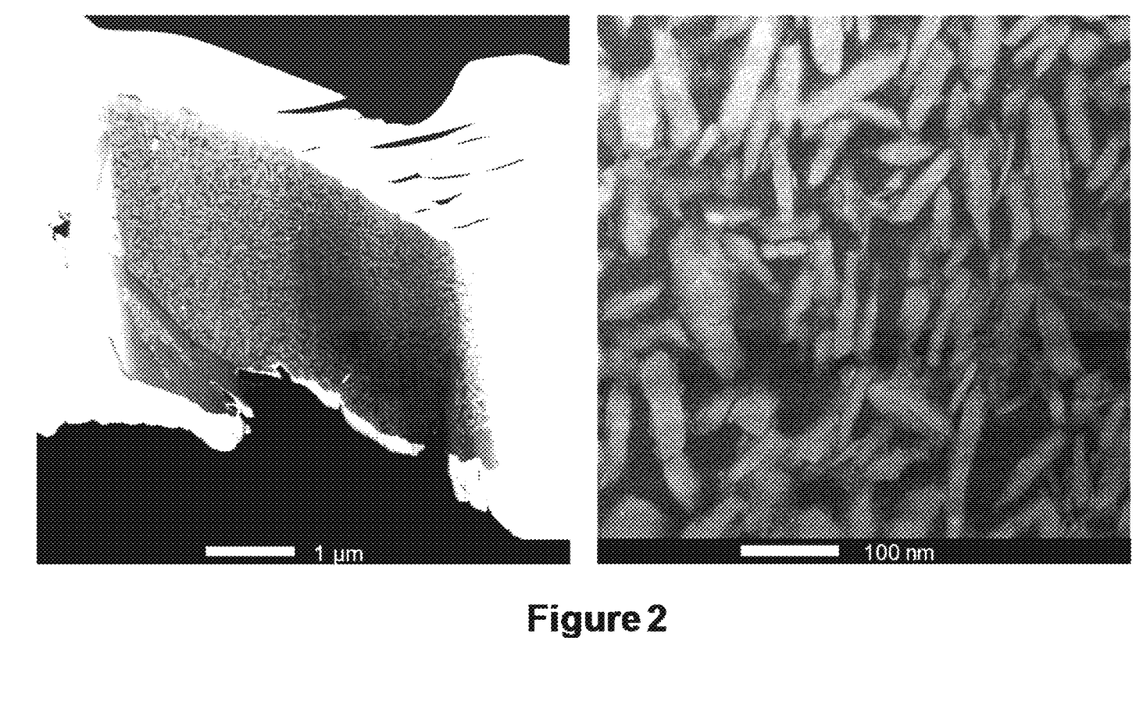
FIG. 2: TEM-based analysis of a cross-section performed on the active material powder Example 4 (E 4). The left picture is an image of the prepared lamella, with cross-sections of Si-based particles clearly visible. The right picture is a magnification of the left picture, allowing an image analysis treatment of the discrete cross-sections of Si-based particles to be performed using the method described below.

A powder in which particles having both a shape factor SF superior or equal to 0.4 and inferior or equal to 0.8 and a $d_{max}$ superior or equal to 10 nm and inferior or equal to 250 nm, constitute at least 65 percent of the field of view provided by TEM, may be referred to as a powder according to the present invention. Alternatively, a powder in which particles having both a shape factor SF superior or equal to 0.5 and inferior or equal to 0.8 and a $d_{max}$ superior or equal to 10 nm and inferior or equal to 250 nm, constitute at least 65 percent of the field of view provided by SEM, may equivalently be referred to as a powder according to the present invention. FIG. 2 is a TEM picture showing the cross-sections of Si-based particles comprised in the active material powder E 4.

TABLE 3

Process parameters used for the production of nano-silicon powders, powders further used for the production of active material powders CE 3, CE 4, E 3 and E 4, and physico-chemical properties of those nano-silicon powders
Table 3

|  | Si powder used in Counter Example 3 (CE 3) | Si powder used in Counter Example 4 (CE 4) | Si powder used in Example 3 (E 3) | Si powder used in Example 4 (E 4) |
|---|---|---|---|---|
| Radio frequency/Power (kW) | 50 | 45 | 40 | 35 |
| Precursor injection rate (g/h) | 200 | 260 | 330 | 380 |
| Argon flow/quench (Nm³/h) | 90 | 60 | 40 | 35 |
| Milling time (min) | 0 | 230 | 495 | 950 |
| Oxygen content (%) | 6.9 | 7.2 | 7.1 | 7.2 |
| d10 (nm) | 63 | 61 | 62 | 62 |
| d50 (nm) | 113 | 111 | 112 | 111 |
| d90 (nm) | 205 | 208 | 206 | 207 |

TABLE 4

Silicon and oxygen contents and number of discrete cross-sections of silicon-based particles satisfying both conditions of shape factor and $d_{max}$ measured for the final active material powders CE 3, CE 4, E 3 and E 4
Table 4

|  | Counter Example 3 (CE 3) | Counter Example 4 (CE 4) | Example 3 (E 3) | Example 4 (E 4) |
|---|---|---|---|---|
| Si content (%) | 35.0 | 34.9 | 34.8 | 34.9 |
| O content (%) | 5.6 | 5.7 | 5.6 | 5.7 |
| Percentage of discrete cross-sections of Si-based particles satisfying $0.4 < SF < 0.8$ and $10\ nm < d_{max} < 250\ nm$ (%) | 35 | 61 | 80 | 92 |
| Percentage of discrete cross-sections of Si-based particles satisfying $0.5 < SF < 0.8$ and $10\ nm < d_{max} < 250\ nm$ (%) | 35 | 60 | 77 | 87 |

Electrochemical Analyses

The BET surface area of all active material powders produced is measured. It ranges between 2.5 and 3.5 m²/g. No porosity can be observed by SEM or TEM imagery in any of the prepared active material powders CE 1, CE 2, CE 3, CE 4, E 1, E 2, E3 and E 4.

The electrochemical performance of the active material powders CE and E is measured in full-cells. The results are shown in Table 5.

TABLE 5

Electrochemical performance obtained for full-cells containing the active material powders CE and E as anode material
Table 5

| Active material powder | Specific Capacity (mAh/g of active material powder) | Percentage of discrete cross-sections of Si-based particles satisfying $0.4 < SF < 0.8$ and $10\ nm < d_{max} < 250\ nm$ (%) | Percentage of discrete cross-sections of Si-based particles satisfying $0.5 < SF < 0.8$ and $10\ nm < d_{max} < 250\ nm$ (%) | Number of cycles when 80% of discharged capacity measured at cycle 2 is reached |
|---|---|---|---|---|
| CE 1 | 733 | 34 | 34 | 248 |
| CE 2 | 729 | 62 | 60 | 285 |
| E 1 | 728 | 79 | 77 | 325 |
| E2 | 731 | 92 | 86 | 361 |
| CE 3 | 1265 | 35 | 35 | 124 |
| CE 4 | 1260 | 61 | 60 | 144 |
| E 3 | 1268 | 80 | 77 | 168 |
| E4 | 1264 | 92 | 87 | 185 |

It can be seen that for both silicon contents (circa 15 wt % and circa 35 wt %), the cells containing the active material powder according to the invention perform significantly better than the cells containing the active material powder not according to the invention.

The invention claimed is:

1. An active material powder for use in a negative electrode of a battery, said active material powder comprising active material particles, wherein the active material particles comprise silicon-based particles, said active material powder being characterized in that, when it is crossed by a plane so that at least 1000 discrete cross-sections of silicon-based particles, having a perimeter and an area, are included in said plane, then at least 65% of said at least 1000 discrete cross-sections of silicon-based particles observed by means of SEM or TEM have both:
   a shape factor $SF=d_{disc}/d_{max}$ superior or equal to 0.4 and inferior or equal to 0.8, and
   a $d_{max}$ superior or equal to 10 nm and inferior or equal to 250 nm,
wherein $d_{max}$ is the linear distance between the two most distant points of the perimeter of a discrete cross-section of a silicon-based particle, and wherein $d_{disc}$ is the diameter of a discus having an identical area as the one of said discrete cross-section of said silicon-based particle, said diameter $d_{disc}$ being calculated using the following formula:

$$\text{area disc} = \pi \times \left(\frac{d_{disc}}{2}\right)^2 = \text{area Si},$$

$$\text{wherein } d_{disc} = 2 \times \sqrt{\frac{\text{area Si}}{\pi}}.$$

2. The active material powder according to claim 1, wherein at least 70% of the at least 1000 discrete cross-sections of said silicon-based particles included in the plane crossing the active material powder have both a shape factor $SF=d_{disc}/d_{max}$ superior or equal to 0.4 and inferior or equal to 0.8, and a $d_{max}$ superior or equal to 10 nm and inferior or equal to 250 nm.

3. The active material powder according to claim 1, wherein the shape factor $SF=d_{disc}/d_{max}$ is superior or equal to 0.5 and inferior or equal to 0.8.

4. The active material powder according to claim 1, wherein the active material powder further comprises a matrix material and the silicon-based particles are embedded in the matrix material.

5. The active material powder according to claim 1, wherein the active material powder has a volume-based particle size distribution wherein the d10 is comprised between 1 µm and 10 µm, and the d50 is comprised between 3 µm and 30 µm, and the d90 is comprised between 5 µm and 50 µm.

6. The active material powder according to claim 1, characterised in that it has an oxygen content and an average silicon content A with respect to the total weight of the active material powder expressed as wt %, wherein the oxygen content expressed in wt % is less than 35% of A.

7. The active material powder according to claim 1, characterised in that it has a BET value of less than 10 m²/g.

8. The active material powder according to claim 1, characterised in that the active material particles have a porosity of less than 20% in volume.

9. The active material powder according to claim 1, wherein the active material powder comprises at least 90% by weight of said active material particles with respect to the total weight of the active material powder.

10. The active material powder according to claim 4, wherein the matrix material is a carbon-based matrix material.

11. The active material powder according to claim 4, characterised in that the matrix material is at least one of the following compounds: polyvinyl alcohol (PVA), polyvinyl chloride (PVC), sucrose, coal-tar pitch and petroleum pitch, or the matrix material is a thermally decomposed product of at least one of said compounds.

12. The active material powder according to claim 4, characterised in that the active material powder also contains graphite, wherein the graphite is not embedded in the matrix material.

13. The active material powder according to claim 1, characterized in that the silicon-based particles have a chemical composition having at least 65% by weight of silicon.

14. The active material powder according to claim 13, wherein the silicon-based particles are free of other elements than Si and O.

15. A battery comprising the active material powder of claim 1.

16. An electronic device comprising a battery according to claim 15.

* * * * *